United States Patent [19]

Andersson et al.

[11] Patent Number: 5,837,864

[45] Date of Patent: Nov. 17, 1998

[54] METHOD FOR PRODUCING A SUSPENSION IN WATER OF A CELLULOSE ETHER, AND DRY MIXTURE SUITABLE FOR USE IN THE PRODUCTION OF THE SUSPENSION

[75] Inventors: Lars Andersson, Stenungsund; Peter Boström, Kungälv, both of Sweden

[73] Assignee: Akzo Nobel NV, Arnhem, Netherlands

[21] Appl. No.: 860,242

[22] PCT Filed: Nov. 16, 1995

[86] PCT No.: PCT/SE95/01362

§ 371 Date: Jun. 10, 1997

§ 102(e) Date: Jun. 10, 1997

[87] PCT Pub. No.: WO96/18676

PCT Pub. Date: Jun. 20, 1996

[30] Foreign Application Priority Data

Dec. 15, 1994 [SE] Sweden ................................... 9404373

[51] Int. Cl.$^6$ ............................ C08B 11/00; C08B 11/08; C08B 11/193; C08B 1/00
[52] U.S. Cl. ............................... 536/124; 536/84; 536/90; 536/91; 536/95; 536/96; 536/99; 536/100
[58] Field of Search ............................... 536/124, 84, 90, 536/91, 95, 96, 99, 100

[56] References Cited

U.S. PATENT DOCUMENTS 3,356,519 12/1967 Chambers et al. ....................... 106/187
3,926,951 12/1975 Lindenfors et al. ....................... 536/91

FOREIGN PATENT DOCUMENTS

| 0 003 582 | 8/1979 | European Pat. Off. .......... C08L 1/26 |
| 0 413 274 | 2/1991 | European Pat. Off. .......... C08L 1/28 |
| 0 482 533 | 4/1992 | European Pat. Off. .......... C08J 3/03 |
| 48026494 | 8/1993 | Japan . |
| WO 95/30705 | 11/1995 | WIPO .............................. C08J 3/03 |

OTHER PUBLICATIONS

*Water–soluble cellulose ethers with high solubility*, Wood Products, vol. 79, 1973.

*Primary Examiner*—Douglas W. Robinson
*Assistant Examiner*—Everett White
*Attorney, Agent, or Firm*—Ralph J. Mancini

[57] ABSTRACT

In a method of producing a suspension of a nonionic cellulose ether that has no turbidity point, the water forming part of the suspension is mixed with a dry mixture containing a cellulose ether, which is cross-linked with glyoxal, and an electrolyte salt. This electrolyte salt consists of a salt of a mixture of salts which, in water and at the concentration employed, results in a pH value below 8.0. Preferably, the cellulose ether is a hydroxyethylcellulose.

14 Claims, No Drawings

METHOD FOR PRODUCING A SUSPENSION IN WATER OF A CELLULOSE ETHER, AND DRY MIXTURE SUITABLE FOR USE IN THE PRODUCTION OF THE SUSPENSION

This application is a 371 of PCT/SE95/01362, which was filed Nov. 16, 1995.

The present invention relates to a method for producing a suspension of a nonionic cellulose ether that has no turbidity point by mixing the water forming part of the suspension with a dry mixture that contains a cellulose ether, which is cross-linked with glyoxal, and an electrolyte salt.

Water-soluble, nonionic cellulose ethers are used in many industrial processes as well as in various consumer goods. The fields of application include mining, paper production, water treatment, textile treatment, colour compositions, detergents and cosmetic products. However, it is difficult to dissolve pulverulent, water-soluble and non-ionic cellulose ethers, owing to the powder having a tendency towards gelling and agglomeration. One way of solving this problem is to suspend the water-soluble cellulose ethers in water containing a considerable amount of electrolyte and, optionally, a dispersant and/or a stabiliser. When water is mixed in, the electrolyte content is reduced and the cellulose ethers are dissolved without any gelling or lump formation. The cellulose ethers suspended in water have proved to be well suited for use as intermediary products in industrial processes, as well as in the production of consumer goods.

Thus, European Patent Application 413 274 teaches an aqueous suspension of hydroxyethylcellulose, i.e. a cellulose ether having no turbidity point in water. This suspension contains a water-soluble hydroxyethylcellulose in an amount of 8–28% by weight and further contains 20–35% by weight of potassium carbonate, based on the weight of potassium carbonate and water, 0.2–8% by weight of a detergent having a HLB value of 6–9, as well as 0.08–0.6% by weight of a water-soluble or water-swellable thickener, both contents being based on the weight of the total suspension.

European Patent Application 482 533 further discloses the suspension of a nonionic cellulose ether, such as hydrophobe-modified hydroxyethylcellulose, hydrophobe-modified ethyl-hydroxyethylcellulose, methylcellulose and hydroxyethylcellulose, in an aqueous sodium formate solution. It appears from the Examples that the amount of sodium formate should be at least 30% by weight, if one is to obtain a suspension.

Further, European Patent Application 3 582 discloses a method of reducing the electrolyte content of the suspension of water-soluble nonionic cellulose ethers. According to the European application, this is achieved by adding not only an electrolyte salt but also an aluminium oxide compound. Owing to the addition of aluminium oxide, the electrolyte content may, according to the patent application, be reduced from about 25% to 10%. The presence of aluminium oxide in solid or colloidal state may, however, have adverse effects when the suspension is used at a later stage.

One object of the present invention is to provide a method for suspending a cellulose ether, which has no turbidity point in water, together with an electrolyte salt and optionally other ingredients, such as a stabiliser and/or a dispersant, directly in the aqueous phase without there being any gelling. The invention thus provides a simple and reliable method for producing the suspension.

According to the invention, it has now been found that this object can be attained by producing an aqueous suspension of a water-soluble nonionic cellulose ether, which has no turbidity point in water. This is achieved by preparing a dry mixture which contains the nonionic cellulose ether cross-linked with glyoxal, as well as an electrolyte salt consisting of a salt or a mixture of salts which, in water and at the concentration used in the suspension, results in a pH value below 8.0, preferably below 7.5, and mixing the water forming part of the suspension with the dry mixture. Conveniently, the cellulose ether constitutes 8–25% by weight of the suspension, whereas the electrolyte salt is present in an amount of 20–45% by weight of the suspension, preferably 25–40%. Apart from the cellulose ether and the electrolyte salt, the suspension suitably contains a stabiliser, which consists of a viscosity-enhancing polymer soluble in the electrolyte solution and present in an amount of 0.01–3% by weight of the suspension. Conveniently, the suspension also contains a dispersant, such as a surfactant, in an amount of 0.05–4% by weight. As a rule, the dispersant has a stabilising and viscosity-enhancing effect.

In a preferred mode of implementation of the inventive method, the suspension is produced by mixing the water with a dry mixture which, apart from the cellulose ether and the electrolyte salt, contains all the dry ingredients of the suspension. In the event that one of the ingredients of the suspension is liquid, this ingredient is suitably applied to a carrier and incorporated in the dry mixture in this form. If so desired, one or more of the ingredients, excepting the cellulose ether and the electrolyte salt, may also be added to the water after and/or before the dry mixture containing the cellulose ether and the electrolyte salt has been mixed with the water. Thorough tests have shown that the inventive method cannot be implemented unless the cellulose ether is cross-linked, since minor amounts of the cellulose ether would otherwise dissolve and form a gel. A number of important advantages are gained by preparing a dry mixture of all the ingredients, excepting water, in a first stage, since a suspension of the cellulose ether can then be prepared by adding water to a single dry composition.

Such a dry mixture suitably contains 20–45% by weight of the cellulose ether, preferably 30–40% by weight, and 50–80% by weight of the electrolyte salt, preferably 55–70% by weight. In addition, the dry composition may contain 0.02–6% by weight of a stabiliser and 0.1–8% by weight of a dispersant.

As indicated in the foregoing, the electrolyte salt consists of a salt or a mixture of salts which, at the contemplated electrolyte content of the aqueous suspension, results in a pH value below 8.0, preferably below 7.5. The reason for this is that the cross-linked cellulose ether is partly hydrolysed at high pH values, thus forming a gel. Examples of suitable salts are sodium formate, NaCl, $Na_2SO_4$, $K_2SO_4$, $NaH_2PO_4$, $NaHCO_3$, $NaNO_3$ and $MgSO_4$. Sodium formate is especially preferred owing to its high solubility, as are alkali salts with bivalent anions, such as $Na_2SO_4$ and $K_2SO_4$. A preferred electrolyte salt contains at least 50% by weight of sodium formate, one or more acid salts, such as a $NaH_2PO_4$, in such an amount that the suspension preferably obtains a pH value of 5.5–7.0, and 0–25% by weight of a bivalent alkali salt. By selecting an electrolyte salt which at least partly is made up of salts with bivalent anions, one is able to slightly reduce the salt content of the suspension. In addition, the amount of salt required depends on the degree of cross-linkage of the cellulose ether and on the temperature of the suspension. Thus, the salt requirement diminishes with an increasing temperature and an increasing degree of cross-linkage.

Conveniently, the nonionic cellulose ether is a hydroxyethylcellulose that is cross-linked with glyoxal. Apart from the hydroxyethyl substituent, the cellulose ether may contain other substituents, such as hydroxypropyl and methyl groups, provided that the content thereof is so restricted that the cellulose ethers do not obtain any turbidity point in water, as measured in a 1% aqueous solution. The molecular substitution of hydroxyethyl suitably is 1.0–3.0, whereas the molecular substitution of hydroxypropyl and methyl suitably is respectively 0.0–0.4 and 0.0–0.8. The cross-linkage with glyoxal is carried out in a manner known per se. The cellulose ether has a suitable degree of cross-linkage when a 1% aqueous solution of the cross-linked cellulose ether at a temperature of 20° C. and a pH value of 7.0 results, after 5 min of agitation, in a viscosity increase of less than 5%, preferably less than 1%, of the viscosity obtained when the cross-linked cellulose ether is completely dissolved. Cellulose ethers having a suitable degree of cross-linkage are obtained when 0.05–2 parts by weight of glyoxal is caused to react with 100 parts by weight of dry cellulose ether.

In order to enhance the stability of the suspension, it has been found suitable to add polymeric stabilisers that are soluble in the electrolyte solution, such as xanthan gum and CMC.

Examples of suitable dispersants are ionic low-molecular polymers having a molecular weight of 1000–15000, such as low-molecular polyacrylic acids; nonionic surfactants, such as ethyleneoxy adducts of alcohols having 10–18 carbon atoms and alkyl phenols having a total of 14–18 carbon atoms and block polymers of ethylene oxide and propylene oxide; anionic surfactants, such as linear alkylbenzene sulphonate, laurylether sulphate and phosphate esters of fatty alcohol ethoxylate; cationic surfactants, such as tertiary or quaternary mono- or di-$C_{8-18}$alkylamines; and amphoteric surfactants, such as betaines.

Apart from the components indicated above, the composition may contain biocides, foam inhibitors, corrosion inhibitors, pH-adjusting agents, and so forth.

The present invention will now be further elucidated with the aid of a few Examples.

EXAMPLE 1

Three compositions according to the invention were produced. These compositions contained a hydroxyethylcellulose cross-linked with glyoxal and having an $MS_{hydroxyethyl}$ of 2.5. There was further produced a comparative composition, which contained a hydroxyethylcellulose that was not cross-linked. The compositions contained the following ingredients.

TABLE 1

| Ingredients | Composition | | | |
|---|---|---|---|---|
| | 1 | 2 | 3 | A |
| HEC[1] | 36.7 | — | — | — |
| HEC[2] | — | 36.7 | — | — |
| HEC[3] | — | — | 36.7 | — |
| HEC[4] | — | — | — | 36.7 |
| Sodium formate | 61.2 | 61.2 | 61.2 | 61.2 |
| $NaH_2PO_4$ | 1.1 | 1.1 | 1.1 | 1.1 |
| Xanthan gum | 0.3 | 0.3 | 0.3 | 0.3 |
| $C_{9-11}$-alcohol + 5.5 EO | 0.4 | 0.4 | 0.4 | 0.4 |
| (on carrier) | 0.3 | 0.3 | 0.3 | 0.3 |

[1]The viscosity according to Brookfield in 2% aqueous solution at 25° C. = 400 mPa · s
[2]The viscosity according to Brookfield in 2% aqueous solution at 25° C. = 6,500 mPa · s
[3]The viscosity according to Brookfield in 1% aqueous solution at 25° C. = 2,000 mPa · s
[4]The same substitution and viscosity as in the case of the cellulose ether in composition 1.

Thus, 49 parts by weight of each of the above compositions was dispersed in 51 parts by weight of water. The viscosity and the stability of the aqueous formulations were determined, and the following results were obtained.

TABLE 2

| Composition | Viscosity mPa · s 23° C. | | |
|---|---|---|---|
| No. | 1 day | 10 days | Stability[1] |
| 1 | 800 | 1,000 | +++ |
| 2 | 1,400 | 1,900 | +++ |
| 3 | 1,800 | 2,400 | +++ |
| A | Gel | — | — |

[1]Stability: + = stable for less than 6 h, ++ = stable for more than 6 h but less than 10 days, +++ = stable for more than 10 days.

It is evident from these results that the comparative composition formed a gel and thus was useless, whereas the compositions according to the invention showed no tendency towards gelling during the 10 days of the test period.

EXAMPLE 2

The following compositions according to the invention were produced by mixing the ingredients listed below. Then, 49 parts by weight of each of the compositions was suspended in 51 parts by weight of water.

TABLE 3

| | Composition, parts by weight | | | |
|---|---|---|---|---|
| Ingredients | 4 | 5 | 6 | 7 |
| HEC[1] | 36.7 | — | — | — |
| HEC[2] | — | 36.7 | 36.7 | 36.7 |
| Sodium formate | 53.1 | 31.7 | 53.1 | 58.2 |
| $Na_2SO_4$ | 8.2 | — | 8.2 | — |
| $NaH_2PO_4$ | 1.0 | 30.6 | 1.0 | 1.0 |
| $NaHCO_3$ | — | — | — | 3.1 |
| Xanthan gum | 0.3 | 0.3 | 0.3 | 0.3 |
| $C_{9-11}$-alcohol + 5 EO | 0.4 | 0.4 | 0.4 | 0.4 |
| (on carrier) | 0.3 | 0.3 | 0.3 | 0.3 |

[1]The same cellulose ether as in composition 2.
[2]The same cellulose ether as in composition 1.

The suspensions obtained after suspending the compositions in water were then tested with respect to viscosity and stability. The following results were obtained.

TABLE 4

| Composition | | Viscosity mPa · s 23° C. | | |
|---|---|---|---|---|
| No. | pH | 1 day | 10 days | Stability[1] |
| 4 | 6.4 | 2,400 | 2,600 | +++ |
| 5 | 5.0 | 30 | — | ++ |
| 6 | 6.0 | 700 | 900 | +++ |
| 7 | 7.1 | 1,100 | 1,300 | +++ |

[1]Stability: + = stable for less than 6 h, ++ = stable for more than 6 h but less than 10 days, +++ = stable for more than 10 days.

It is evident from these results that none of the suspensions gelled, but that all had a suitable viscosity. As regards the suspension which separated after a period of storage, a homogeneous suspension could again be obtained by slight agitation.

We claim:

1. A method for producing an aqueous suspension of a water-soluble nonionic cellulose ether having no turbidity point in water, wherein said method comprises preparing a dry mixture which contains the nonionic cellulose ether cross-linked with glyoxal and an electrolyte salt consisting of a salt or a mixture of salts which, in water and at the concentration used in the suspension, results in a pH value below 8.0; and mixing the water forming part of the suspension with the dry mixture in such an amount that the cellulose ether comprises 8–25% by weight of the suspension and the electrolyte salt comprises 20–45% by weight of the suspension.

2. The method of claim 1 wherein the cross-linked cellulose ether incorporated in the dry mixture results, in a 1% aqueous solution at a temperature of 20° C. and a pH value of 7.0, in a viscosity increase which is less than 5% of the viscosity obtained when the cellulose ether is completely dissolved.

3. The method of claim 2 wherein the viscosity increase is less than 1% of the viscosity obtained when the cellulose ether is completely dissolved.

4. The method of claim 1 which comprises preparing the dry mixture from an electrolyte salt which contains at least 50% by weight of sodium formate, one or more acid salts in such an-amount that the suspension has a pH value of 5.5–7.0, and 0–25% by weight of a bivalent alkali salt; and wherein the cellulose ether is a hydroxyethylcellulose.

5. The method of claim 1 which comprises adding all the components forming part of the aqueous phase to the dry mixture.

6. The method of claim 5 which comprises adding a dispersant and/or a stabilizer to the dry mixture.

7. The method of claim 1 which comprises adding a dispersant and/or a stabilizer to the water.

8. The method of claim 1 wherein the pH of the suspension is below 7.5.

9. A dry mixture suitable for use in the production of a suspension of a water-soluble nonionic cellulose ether, which comprises 20–45% by weight a cellulose ether, which is cross-linked with glyoxal and has no turbidity point in water, and 50–80% by weight of a electrolyte salt, which consists of a salt or a mixture of salts which, in water and at the concentration used in the suspension, results in a pH value below 8.0.

10. The dry mixture of claim 9 wherein the cross-linked cellulose ether incorporated in the dry mixture results, in a 1% aqueous solution at a temperature of 20° C. and a pH value of 7.0, in a viscosity increase which is less than 5%, of the viscosity obtained when the cellulose ether is completely dissolved.

11. The dry mixture of claim 10 wherein the viscosity increase is less than 1% of the viscosity obtained when the cellulose ether is completely dissolved.

12. The dry mixture of claim 9 wherein the electrolyte salt contains at least 50% by weight of sodium formate, one or more acid salts in such an amount that the suspension has a pH value of 5.5–7.0, and 0–25% by weight of a bivalent alkali salt, and wherein the cellulose ether consists of a hydroxyethylcellulose.

13. The dry mixture of claim 9 which additionally comprises a dispersant and/or a stabilizer.

14. The dry mixture of claim 9 wherein the pH of the suspension is below 7.5.

* * * * *